United States Patent [19]
Robertson

[11] Patent Number: 5,202,557
[45] Date of Patent: Apr. 13, 1993

[54] METHOD AND APPARATUS FOR DETECTING OVERLAPPING PRODUCTS IN A SINGULATED PRODUCT STREAM

[75] Inventor: Gary S. Robertson, Euless, Tex.

[73] Assignee: ElectroCom Automation L.P., Arlington, Tex.

[21] Appl. No.: 864,433

[22] Filed: Apr. 6, 1992

[51] Int. Cl.⁵ .............................................. G01N 9/04
[52] U.S. Cl. ............................... 250/223 R; 250/560; 235/462
[58] Field of Search ................. 250/222.1, 223 R, 224, 250/560, 561, 566; 235/462, 463, 470; 356/373, 375, 383–386

[56] References Cited

U.S. PATENT DOCUMENTS

| | | | |
|---|---|---|---|
| 3,745,354 | 7/1973 | Vargo | 250/223 R |
| 3,822,009 | 7/1974 | Richards | 250/223 R |
| 4,193,540 | 3/1980 | Dougados et al. | 235/467 |
| 4,634,849 | 1/1987 | Klingen | 235/487 |
| 4,717,026 | 1/1988 | Fischer | 250/566 |
| 4,832,204 | 5/1989 | Handy | 235/385 |
| 5,118,929 | 6/1992 | Scata | 235/462 |

Primary Examiner—David C. Nelms
Assistant Examiner—S. Allen
Attorney, Agent, or Firm—Harold E. Meier

[57] ABSTRACT

A singulated stream of products comprised of both single and overlapping products is transported through a scanning zone along a transport path. Each single or overlapping product defines a shadow on the transport path that is analyzed to determine the presence of product multiples in the product shadow by measuring the width and length of the product shadow. If the length of the product shadow exceeds by more than a predetermined amount the average length of previously measured shadows having a similar width, the shadow likely contains two or more overlapping products. As the product shadow moves through the scanning zone, each product included therein is scanned for affixed bar codes by a plurality of bar code scanners. If two different bar codes or two identical bar codes from mutually exclusive scanners are recorded for a single product shadow, then the shadow likely contains two or more overlapping products.

34 Claims, 9 Drawing Sheets

METHOD AND APPARATUS FOR DETECTING OVERLAPPING PRODUCTS IN A SINGULATED PRODUCT STREAM

TECHNICAL FIELD

The present invention relates to singulating, counting and sorting products and, in particular, to a method and apparatus for ascertaining, prior to mechanical sorting, the presence of two or more overlapping products in a singulated stream of bar coded products moving at a relatively high throughput rate.

BACKGROUND OF THE INVENTION

For purposes of product returns and order filling, it is important to be able to sort and count products accurately and quickly. Such products, for example magazines and retail packages, have historically either been manually sorted and counted by human operators or manually scanned to read an affixed code, counted and then sorted by the human operator according to a product disposition signal provided from the product scanner according to the scanned code. One drawback experienced with these primarily manual methods for separating, counting and sorting is that total product processing time for sorting and counting is a function of each human operator's ability to accurately sort and count products and/or efficiently scan the products to obtain the affixed bar code for sorting and counting. Familiarity with the product and the signals indicating the disposition of each product also factor into the processing time. An additional drawback of the conventional manual separation, counting and sorting process is its susceptibility to error resulting from careless human operators directing products into improper bins. These drawbacks result in errors in the counting of products and delays in the sorting process thereby reducing the net product throughput of and profits for the sorting and counting operation.

The goals of all sorting and counting operations are accuracy, low cost and high throughput product processing. To achieve these goals and, in particular, combat the drawbacks associated with manual sorting and counting operations, automated machines have been provided to singulate stacks of products into a product stream, count the number of singulated products and then sort the products, according to an affixed bar code, for further processing. As is well known, there are two common orientations of bar codes, a ladder code orientation and a picket code orientation. These two orientations are easily distinguished from each other; a ladder code is comprised of a plurality of horizontal bars (like the rungs of a ladder) parallel to a top or bottom edge of a product, and a picket orientation is comprised of a plurality of vertical bars (like the pickets in a fence) parallel to a side edge of a product. Bar codes may be affixed to the product at any one of a number of locations on any outside surface.

The keys to proper counting and sorting of bar coded products are accurate scanning of the affixed bar codes and complete singulation of the product stack into a stream of individual products. Mechanical singulators, like the product singulation apparatus disclosed in commonly assigned, co-pending application for patent Ser. No. 593,783 filed Oct. 5, 1990, however, randomly fail to completely separate two or more products from each other. This failure to completely singulate the stacks of products creates a condition known as a "product multiple" occurrence wherein the non-singulated products either completely or partially overlap one another.

When overlapping products are present in a singulated product stream, the accuracy, throughput and profits of the sorting and counting operation are adversely affected. For example, one or more of the overlapping products are likely to be directed to an incorrect final disposition. Furthermore, in applications, such as returns processing, where accurate counting is imperative, two or more overlapping products are likely to be miscounted as a single product. Accordingly, there is a need for a method and apparatus for accurately detecting the presence of product overlaps in a singulated stream of coded products prior to sorting thereby providing for a more accurate sort and count of the product stream.

SUMMARY OF THE INVENTION

The present invention provides a method and apparatus for detecting overlapping products in a singulated stream of products moving at a relatively high throughput rate by scanning for multiple bar codes in, and measuring the relative dimensions of, the product stream. In accordance with the broader aspects of the invention, a scanning zone is virtually defined on a transport path characterized by a plurality of rotational feed rollers. The transport path receives from a singulation machine a stream of singulated bar coded products that randomly contains non-singulated, overlapping products. Each singulated product or group of overlapping products generates a "shadow" on the transport path. Each shadow is allocated a tracking record by the apparatus that contains product size, bar code, position and sorting disposition information. This information, in particular the product size and bar code information, is used to identify overlapping products in the product shadows.

Photoelectric sensors along the transport path are used to measure the size (length and width) of the product shadows that pass through the scanning zone. Product overlaps are identified in those shadows passing through the scanning zone that have disproportionate measured lengths in terms of their measured widths. The presence of an overlap is further detected by scanning the top and bottom surfaces of products in each shadow passing through the scanning zone for multiple bar codes. For example, if two or more different bar codes are read for a single product shadow or if the same bar code is read from mutually exclusive scanners for a single product shadow, then two or more overlapping products are likely in the shadow and an overlap occurrence has been detected.

The tracking records of each shadow are updated following size measurement and bar code scanning to identify those shadows containing product overlaps. The shadow tracking information is then used in the subsequent mechanical sorting operation to direct all product shadows identified as containing overlapping products into a special sorting bin for reprocessing. As the true number of overlapping products in a shadow is not known (could be two or more), segregating the shadows containing overlapping products from the singulated products through a sorting operation enables a more accurate product count to be made.

BRIEF DESCRIPTION OF THE DRAWINGS

A more complete understanding of the method and apparatus for identifying overlapping products in a singulated product stream may be had by reference to the following Detailed Description when taken in conjunction with the Drawings wherein.

DETAILED DESCRIPTION OF THE DRAWINGS

Figure 1:
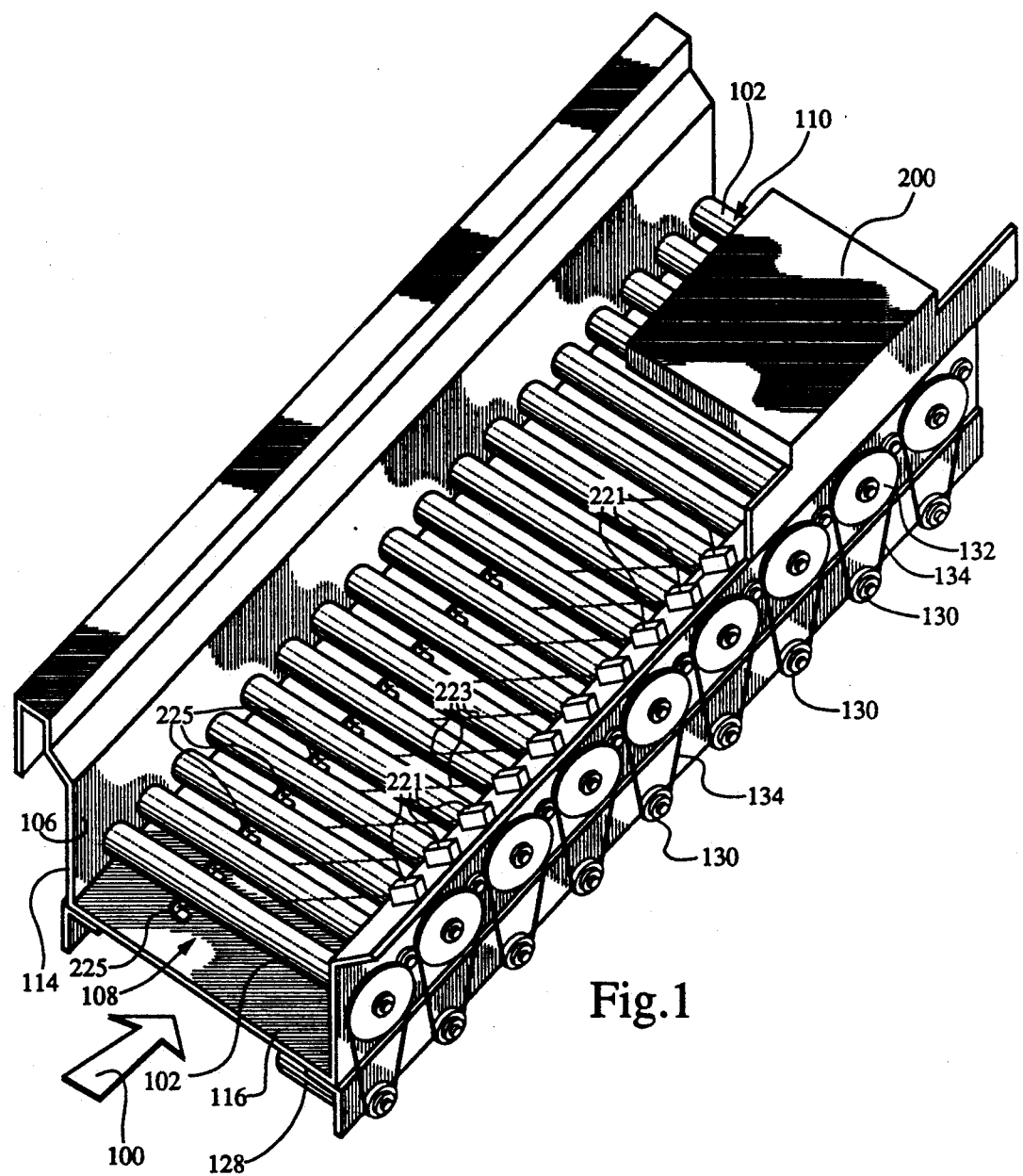
FIG. 1 is an orthogonal view of the transport path and a portion of the overlapping products detection system of the present invention.

Reference is now made to FIG. 1 wherein there is shown an orthogonal view of a transport path, illustrated generally by arrow 100, and a portion of an overlapping products detection system 200 (remaining portion hidden underneath transport path) comprising the present invention. The transport path 100 includes a series of rotating feed rollers 102 arranged on a laterally tilted and inclined plane. The transport path 100 has an inside and an outside rail, 104 and 106, respectively. A lateral tilt (of approximately five degrees) for the scanning transport path 100 positions the inside rail 104 at a lower elevation than the outside rail 106. Configuration of the transport path 100 in this manner causes products (not shown, see FIG. 2A) thereon to slide toward and ride against the inside rail 104 in single file fashion. This positions each product with a side edge flush against (parallel to) the inside rail 104 to facilitate a more accurate identification of product overlaps by the detection system 200 by properly orienting the products for accurate size measurement and scanning of a ladder and picket oriented bar codes.

The transport path 100 has an infeed end 108 for receiving a stream of singulated products. An apparatus for singulating products for input to the transport path 100 is disclosed in commonly assigned, co-pending application for patent Ser. No. 593,783 filed Oct. 5, 1990. The scanning transport path 100 also has an output end 110 for discharging the stream of products for subsequent sorting into designated destination bins according to their scanned bar codes. An apparatus for receiving a singulated stream of products and for sorting the product stream according to scanned bar codes affixed thereto is disclosed in commonly assigned, co-pending application for patent Ser. No. 643,853 filed Jan. 22, 1991.

The transport path 100 is laterally tilted and longitudinally positioned for convenience on an incline to match the approximately five degree tilt and twenty-two degree incline of the disclosed singulating apparatus. It will, of course, be understood that the transport path 100 need not be longitudinally oriented in this manner for proper operation of the scanning system 200. However, by positioning the transport path in this manner, the disclosed singulating apparatus and apparatus of the present invention may share several of the feed rollers 102 at the infeed end 108 thereby reducing construction costs and providing for more efficient operation of the combined singulation, scanning and sorting apparatus.

The singulator attached to the infeed end 108 is designed to separate a product stack into a singulated stream of individual, separated products. It is known, however, that randomly two or more products will fail to separate from each other during the singulation process. These non-separated products will either completely or partially overlap each other creating a condition known as a product overlap (or product multiples) occurrence. The presence of overlapping products in a singulated product stream adversely affects the accuracy, throughput and profits of the sorting and counting operation because the overlapped products will be incorrectly counted as a single product, and because one or more of the overlapping products may be sorted into an incorrect final disposition.

Figure 2A:
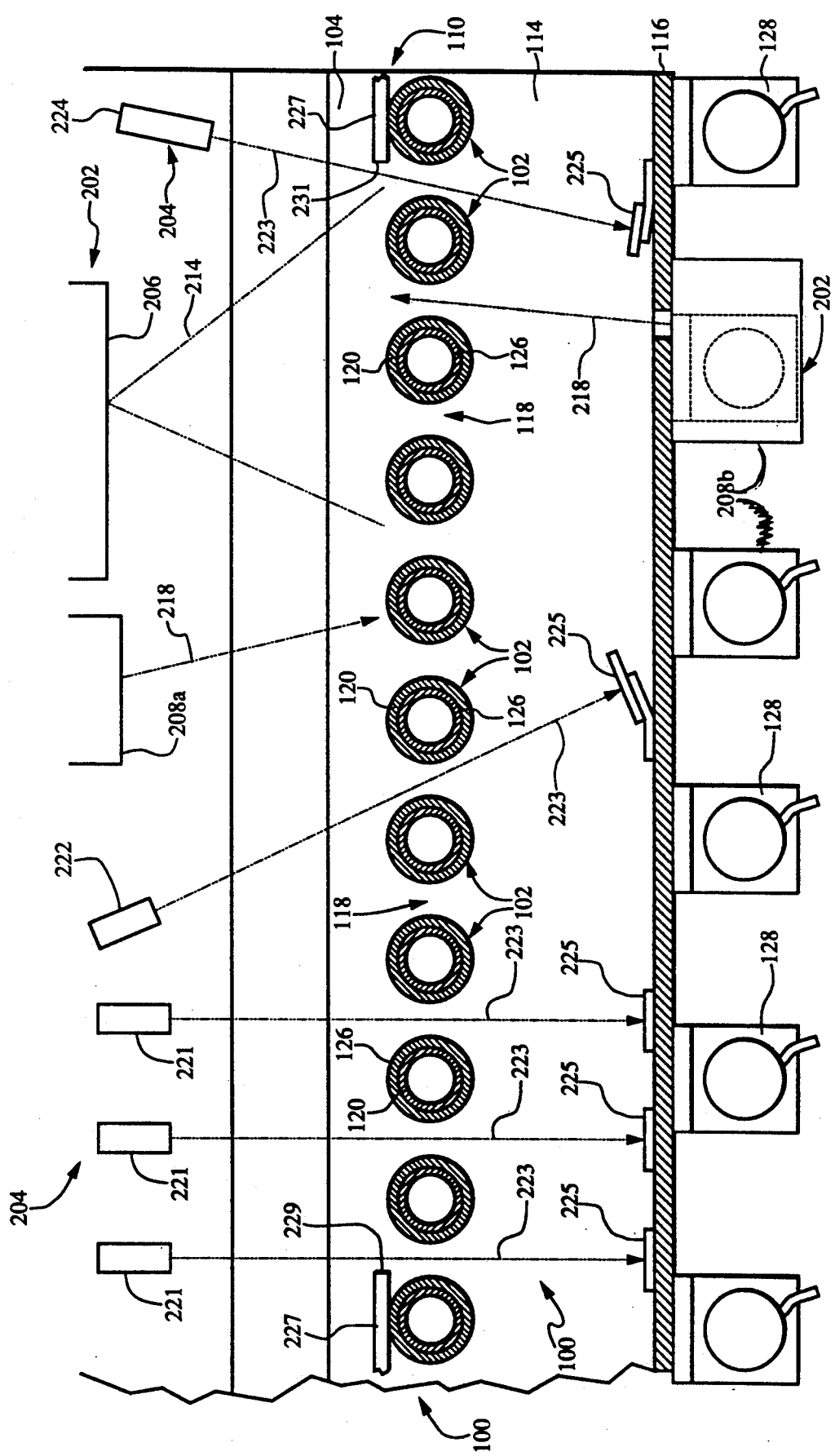
FIG. 2A is a partial longitudinal cross sectional view of the transport path and overlapping products detection system of the present invention.
Figure 2B:
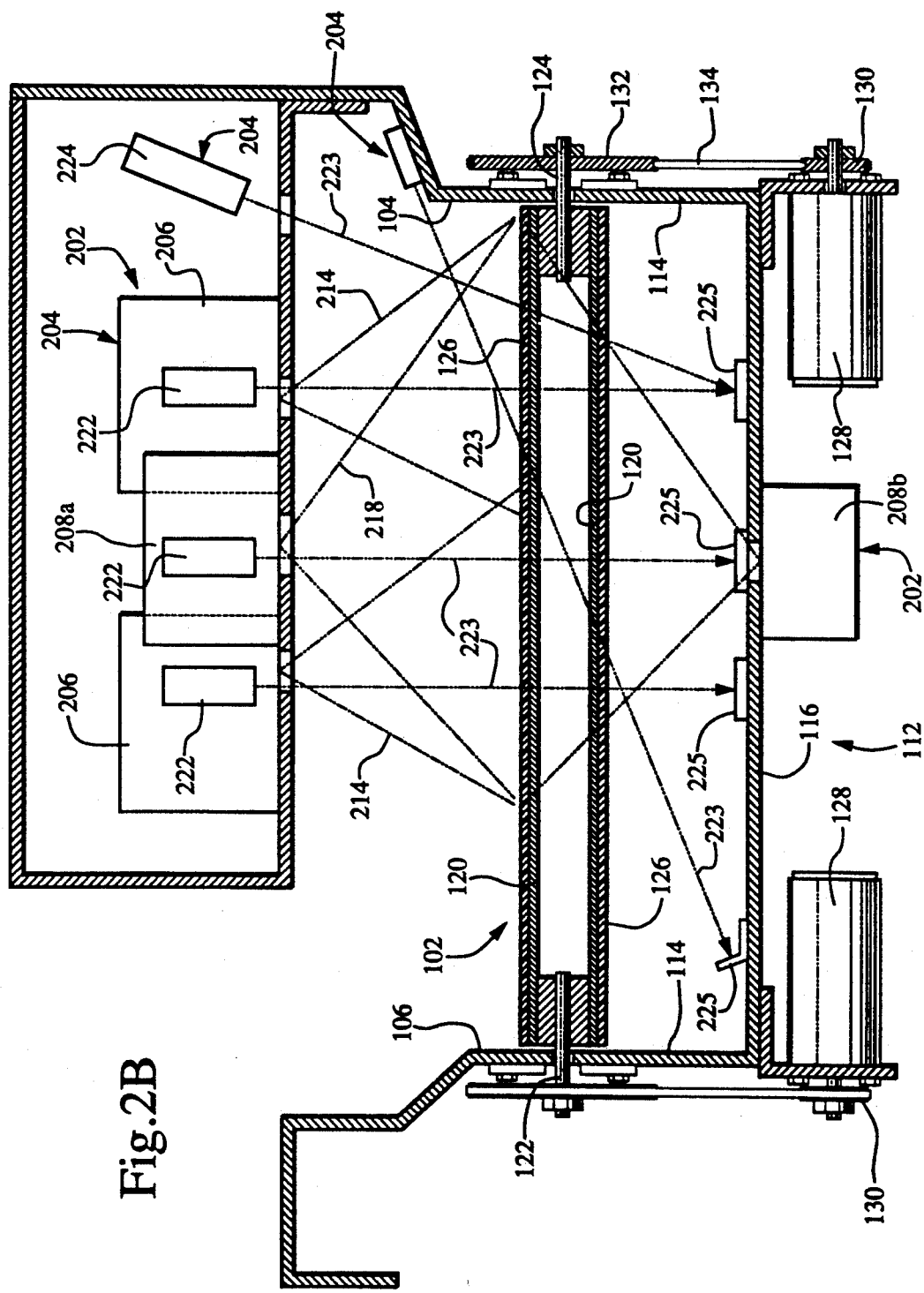
FIG. 2B is a lateral cross sectional view of the scanning transport path and overlapping products detection system of the present invention.

Reference is now made to FIGS. 2A and 2B wherein there is shown a partial, longitudinal cross sectional view and a lateral cross sectional view, respectively, of the scanning transport path 100 and overlapping products detection system 200 of the present invention. The transport path 100 includes a series of feed rollers 102, with each feed roller rotatably mounted to a frame 112. The frame 112 is comprised of an opposed pair of longitudinally extending side plates 114 and a bottom support plate 116. The feed rollers 102 extend transversely between and perpendicular to the opposed side plates 114, and are positioned with respect to each other such that there is a gap 118 between each adjacent pair of rollers.

Each feed roller 102 is comprised of a drive shaft 120 having opposed ends, 122 and 124, with the drive shaft covered by a hard, high friction material 126. The drive mechanism for each feed roller 102 is preferably a D.C. electric motor 128 mounted to the frame 112. A pulley 130 mounted to the motor 128 directs operating power from the motor to a second pulley 132 by means of a drive belt 134. The second pulley 132 is attached to one end, either 122 or 124, of the drive shaft 120 to cause rotation thereof. In the preferred embodiment, one motor 128 is used to actuate one feed roller 102. As shown in FIGS. 1, 2A and 2B, motors 128 for adjacent feed rollers 102 are mounted on opposite sides of the frame 112 so that a proper gap 118 is maintained between adjacent roller pairs without causing the pulleys 130 and 132 and motors for the adjacent rollers to interfere with each other.

The overlapping products detection system 200 is comprised of a bar code scanning subsystem 202 and a product measurement subsystem 204. The scanning subsystem 202 is comprised of a pair of raster scanners 206 and a pair of line scanners 208a and 208b oriented above and below the transport path 100 in the manner shown in FIGS. 2A and 2B. As is well known, raster scanners 206 are preferably used to read ladder oriented bar codes and line scanners 208 are preferably used to read picket oriented bar codes on the surfaces of the individual products in the singulated product stream. In the preferred embodiment of the present invention, the line scanner used is a SCANSTAR 10 Line Scanner and the raster scanner is a SCANSTAR 15 Raster Scanner. These scanners may be purchased from Computer Identics of 5 Shawmut Road, Canton, Mass., 02021.

The scanning subsystem 202 is arranged such that the pair of raster scanners 206 are positioned side-by-side above the transport path 100 to scan for ladder oriented codes on a top surface of each product 227 in the singulated stream of products. The first line scanner 208a is positioned upstream from the pair of raster scanners 206 and above the transport path 100 to scan for picket oriented codes on the top surface of each product 227 in the singulated stream. The second line scanner 208b is positioned below the transport path 100 to scan, through the gap 118 between two adjacent feed rollers 102, for picket oriented codes on a bottom surface of each product 227 in the singulated stream.

Figure 2C:
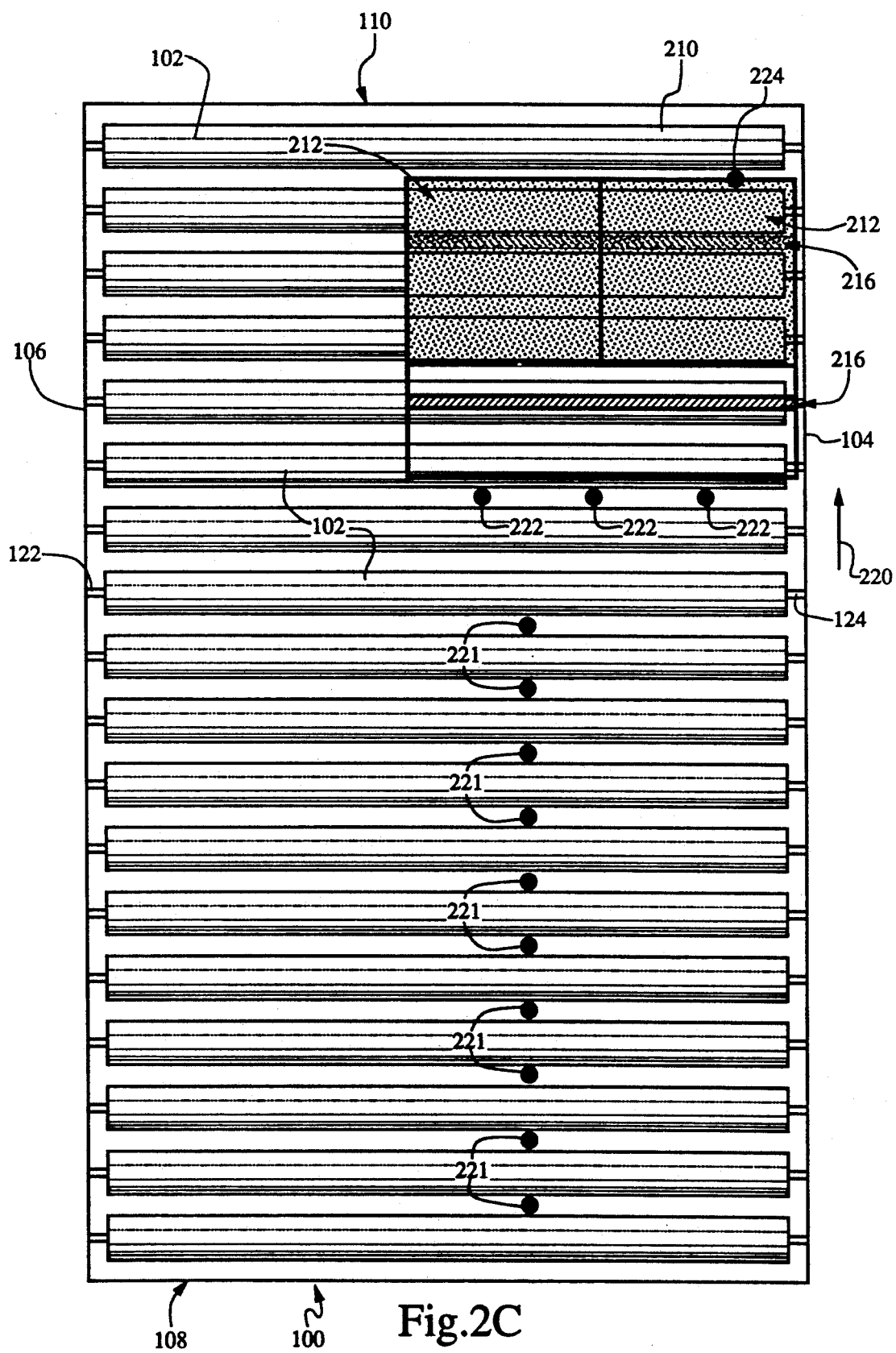
FIG. 2C is a top view of the transport path showing the virtually defined scanning zone.

Reference is now made to FIG. 2C, wherein there is shown a top view of the transport path 100. Orientation of the scanning means of the scanning subsystem 202 in the manner described above results in the virtual definition of a scanning zone 210 on the transport path 100. The scanning zone 210 is offset from the longitudinal center of the transport path 100 and positioned adjacent to the inside rail 104. With such positioning, the scanning subsystem 202 scans, in a more efficient manner, the area of the transport path 100 where the individual products 227 in the product stream are most likely located due to the lateral tilt of the transport path. The scanning zone 210 is comprised of a side-by-side pair of square raster scan zones 212 on the top of the transport path 100 corresponding to the fields of view 214 of the two raster scanners 206 (see FIGS. 2A and 2B) positioned above the transport path. The scanning zone further includes a top side line scan zone 216 and bottom side (shown in broken lines) line scan zone 216 corresponding to the fields of view 218 of the top and bottom line scanners 208a and 208b (see FIGS. 2A and 2B) positioned above and below, respectively, the transport path. Products 227 are transported by the transport path 100 through the scanning zone 210 in the direction shown by arrow 220.

The product measurement subsystem 204 is comprised of a plurality of longitudinal photocells 221 positioned along the length of the transport path 100 (see also FIG. 1), a set of entrance photoelectric cells 222 at the entrance to the scanning zone 210 and an exit photoelectric cell 224 at the exit from the scanning zone 210 (see FIGS. 2A and 2B). Each photocell emits a light beam 223 directed through the gap 118 between adjacent feed rollers 102. The light beam 223 is reflected by a mirror 225 under the transport path back to the photocell for detection. Each product 227, whether singulated or overlapping, that is processed by the apparatus will intercept the photocell light beams 223 thereby generating a "shadow" on the transport path 100 that is detected by the photocells of the product measurement subsystem 204. When a product shadow enters the scanning zone 210, the system 200 assigns a tracking record to the shadow containing shadow measurement, bar code, position, sorted destination and overlap information. The tracking record follows each shadow through the apparatus to assist in any subsequent sorting operation following output from the transport path 100. Furthermore the shadow measurement and bar code information for each shadow is advantageously used to identify a product overlap occurrence in a manner to be described.

The set of entrance photocells 222 are periodically spaced across the width of the transport path 100 perpendicular and adjacent to the inside rail 104 at the beginning of the scanning zone to measure the width of the product shadow. The product shadow width measurement is made relative to the inside rail 104 because the lateral tilt of the singulator will cause the products to be lined up in single file fashion against the inside rail. The entrance photocells 222 further detect any skewing of the product shadow by comparing the time each entrance photocell is blocked. If blocking by the shadow does not occur at substantially the same time, the product in the shadow is likely skewed with respect to the inside rail. Identification of skewed products in the stream is important because skewing affects the accuracy of the product shadow width and length measurements.

In the preferred embodiment, the photocells 221 measure length of each product being transported downstream by determining the number of contiguous cells covered by the product shadow. As the distance between adjacent cells 222 is fixed, the number of contiguously covered cells multiplied by adjacent cell distance provides an approximation of the shadow length. This measurement of length is continuously updated as the product is transported downstream toward the scanning zone. When the product shadow reaches the entrance photocells 222, the most recent product shadow length measurement is accessed to determine whether two or more products are present in the shadow. The entrance photocells 222, in addition to measuring width, may also be configured to measure the length of the shadow by measuring the elapsed time between detection of the leading edge 229 and trailing edges 231 of the shadow. The product measurement subsystem 204 is also used to assist the scanning subsystem 202 in matching (assigning) scanned bar codes to particular shadows in the product stream. With each detected leading edge 229 of a product 227 entering the scanning zone 210, the set of entrance photocells 222 signal a system computer (see FIG. 3) receiving information from the scanning subsystem 202 of a new shadow in the singulated product stream. The system computer then allocates a tracking record for the shadow and opens a scanner read window for the shadow moving through the scanning zone 210. While the window is open, all bar codes read by the scanning subsystem 202 are assigned to the tracking record for the shadow presently traversing the scanning zone. When a trailing edge 231 of the product 227 is detected by the exit photocell 224, the computer is signalled of the exit of the product shadow from the scanning zone 210 and the scanner read window is closed to prevent any other read bar codes from being assigned to the product shadow. The bar codes matched to each shadow during the opening of the scanner read window are then analyzed in a manner to be described to determine if two or more overlapping products are present therein.

For properly separated products, the scanning subsystem 202 should match only one bar code to the tracking record for each shadow. However, multiple bar codes can be reported to the tracking record for a shadow having only a single product therein if the same bar code is scanned by the same or different scanners two or more times while the scanner read window is open. The reporting of multiple bar codes for a single product in a product shadow creates ambiguities in the overlapping product determination that must be resolved in order to accurately identify an overlap occurrence from a tracking record containing two or more matched bar codes.

Accordingly, the scanning subsystem 202 identifies a product overlap occurrence when multiple bar codes are matched to a shadow according to the following rules: 1) any combination of two or more different bar codes in a single shadow indicates an overlap occurrence; 2) two or more identical bar codes read by multiple non-mutually exclusive raster scanners are assumed to be a rescan of the same code; 3) two or more identical bar codes read by a single line scanner in a single shadow indicates an overlap occurrence if the read times for the multiple scans differ by a predetermined amount of time; and 4) two or more bar identical bar codes read by mutually exclusive line scanners in a single shadow indicates an overlap occurrence.

The product measurement subsystem 204 identifies product overlaps by recognizing that most product overlaps are partial overlaps. Thus, the shadow generated by a product overlap on the transport path appears to be a single product having greater than expected length in comparison to its width. This extra length is used by the product measurement subsystem 204 to detect the presence of the overlap even when the scanning subsystem 202 fails to identify the presence of two or more products in a single shadow from the scanning and matching of multiple bar codes. This could occur, for example, when the overlap of the products covers up the bar code for the additional product preventing discovery by the scanning subsystem 202.

In the product measurement subsystem 204, the length and width of each shadow are measured by the photocells 221 and 222, respectively, in the manner described above. This measurement information is stored, updated and accessed in the tracking record for each shadow. By comparing the measured length of the present shadow to the average measured length for prior shadows having a similar width, a determination is made as to whether more than one product is present in the shadow. If the measured length exceeds the average length by a predetermined amount, this indicates the existence of a partial overlap of two or more products in the shadow. This length based overlap examination will not identify an overlap occurrence if two or more products present are completely overlapped since the measured and average lengths will be almost identical.

Operation of the scanning and product measurement subsystems of the detection system 200 and some of the rules for determining a product overlap occurrence may be best understood through a simple example. The set of entrance photocells 222 will detect the leading edge of a shadow associated with one or more magazines in a singulated magazine stream. The number of entrance photocells 222 detecting the magazine shadow provides a width measurement for the products. As is known, the length of a magazine is often related to its width and magazines generally come in only a few different relatively standard dimensions (compare sizes of "TV Guide", "Time" and "Life" magazines). The number of contiguous longitudinal photocells 221 detecting the magazine shadow prior to detection of the shadow leading edge by the entrance photocells 222 provides a length measurement for the products. The width and length measurements are then compared and if not consistent with each other and industry standards for magazines (as determined from prior shadow measurements), a product overlap occurrence is signalled and recorded for that shadow in its tracking record.

Continuing with the preceding example, following detection of the leading edge of the magazine shadow, the scanner read window is opened and the raster and line scanners 206 and 208 of the scanning subsystem 202 scan the moving magazine shadow for bar codes. Scanning will continue until the transport path carries the shadow downstream and the trailing edge of the shadow is detected by the exit photocell. The scanner read window is then closed for that shadow. If, for example, two different bar codes are matched to the tracking record by the scanning subsystem for a single shadow (a violation of rule one above), two or more products are likely in the shadow causing an overlap occurrence to be signalled and recorded in the tracking record for that shadow. The operation of the scanning and product measurement subsystems will be more fully and precisely described with respect to FIGS. 4 and 5A-5C as described below.

Figure 3:
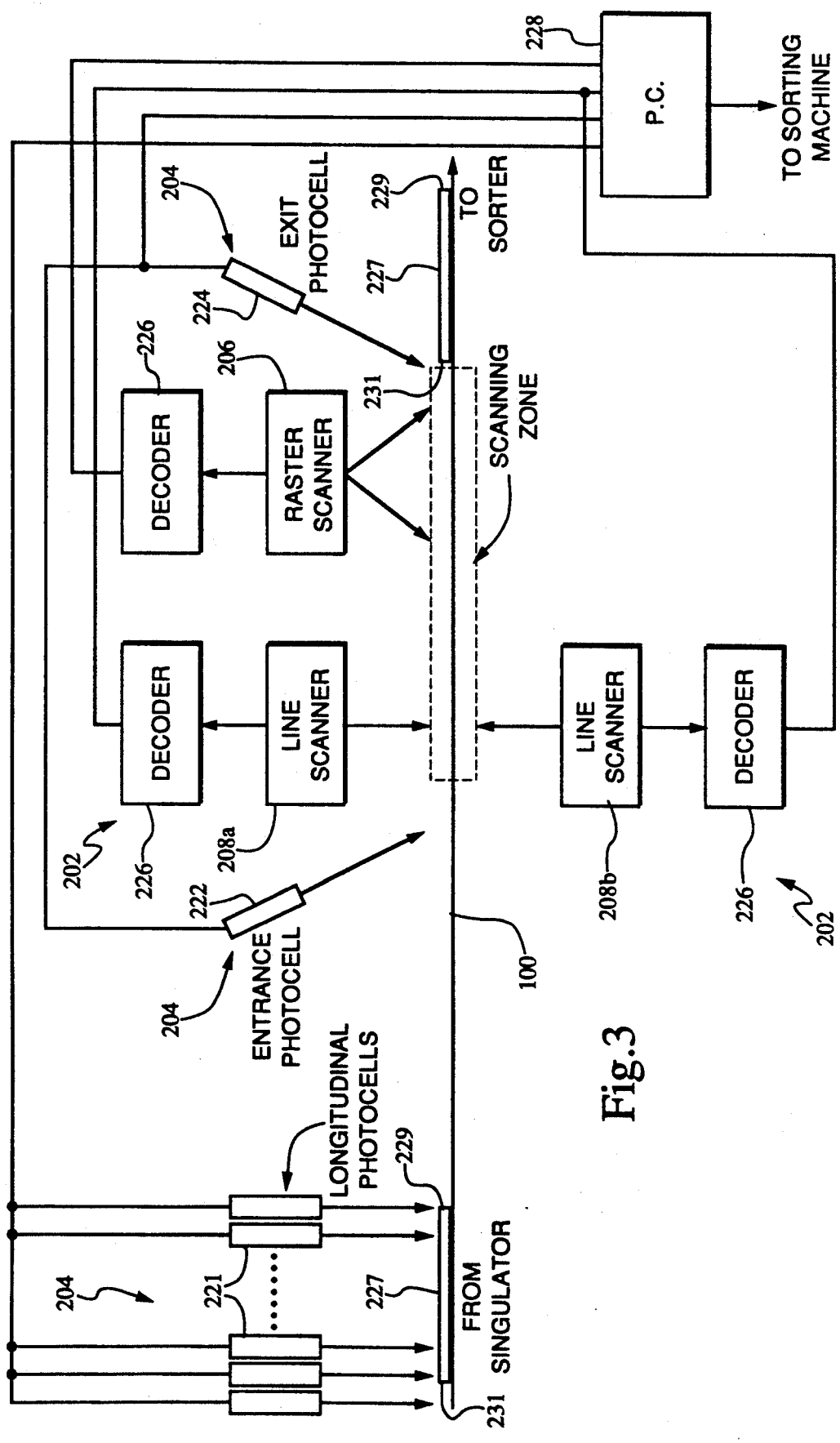
FIG. 3 is a schematic view of the overlapping products detection system of the present invention.
Figure 4:
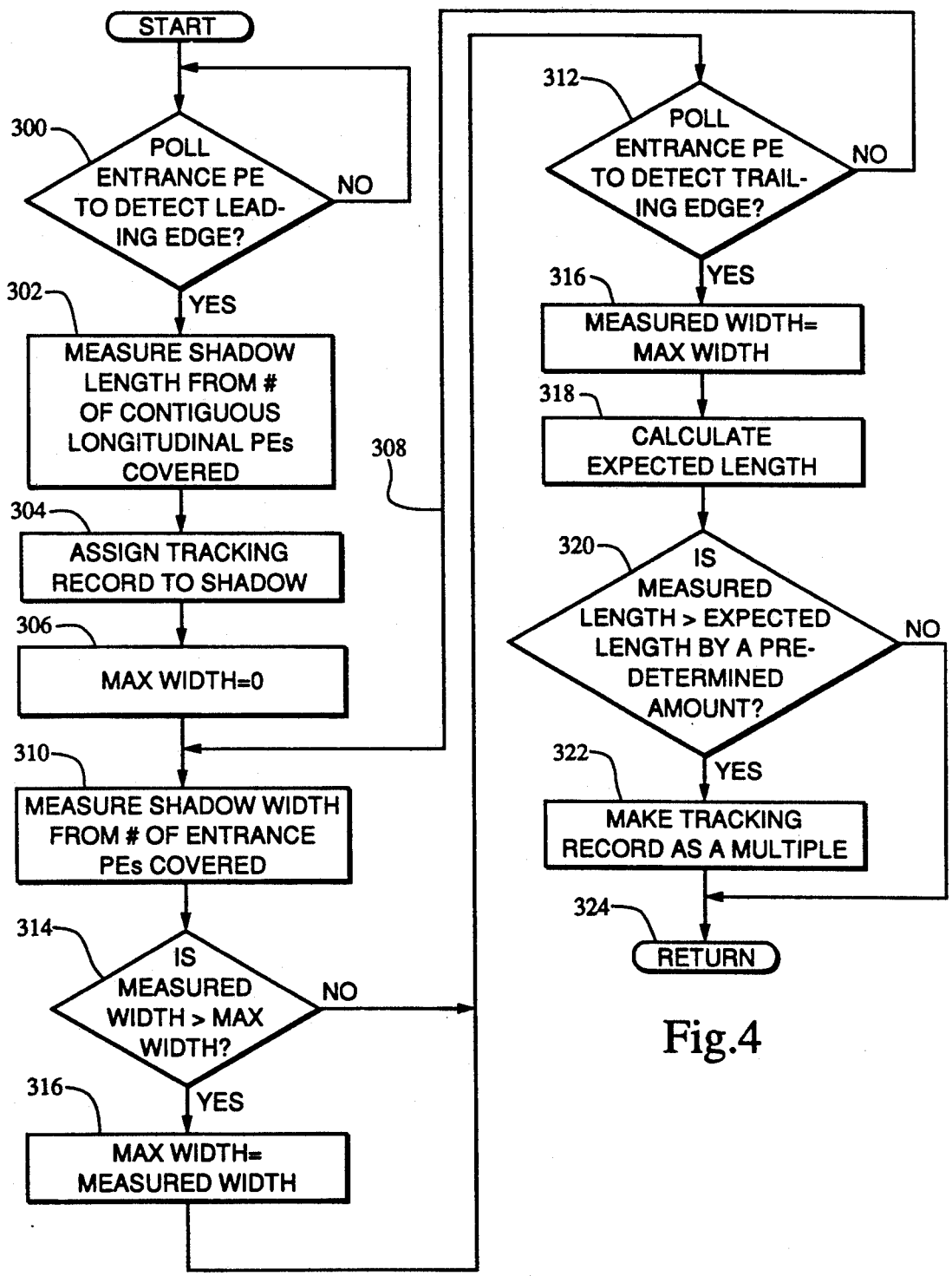
FIGS. 4 and 5A-5C are flow diagrams for detecting overlapping products in a singulated product stream using the apparatus of FIGS. 1, 2A, 2B, 2C and 3.

Reference is now made to FIG. 3 wherein there is shown a schematic view of the scanning subsystem 202 and product measurement subsystem 204. Associated with each raster scanner 206 or line scanner 208 in the scanning subsystem 202 is a decoder 226 for decoding the scanned optical information and outputting an information signal related to the scanned bar code(s) for each shadow. The decoding operation involves a translation of the output data formats for the information signals of each different scanner into a common, computer understandable format disclosing the scanned code. Decoding of the optical information signals output by each raster and line scanner is provided by a SCANSTAR 240 Decoder also purchased from Computer Identics. The scanned codes are then transmitted from the scanning subsystem 202 to a host computer 228 where a determination is made on whether the multiple bar codes matched to a shadow indicate the presence two or more overlapping products. The computer 228 also analyzes the output codes by means of a look-up table to determine the proper sorted output disposition for the product in the shadow. The computer 228 further accurately counts and categorizes the scanned products in the stream according to the affixed codes. The computer 228 then signals the subsequent sorting machine to sort the product stream according to the determined product disposition.

The raster and line scanners of the scanning subsystem 202 continuously scan the scanning zone on the transport path 100 for bar codes. In order to associate a scanned bar code with a particular product shadow in the stream, the computer 228 uses the photocells 222 and 224 at the entrance to and exit from the scanning zone to open and close the scanner read window to correspond to the scanning zone 210 and to identify and track product shadows along the transport path 100. The computer 228 thus accepts for matching only those bar codes scanned during the time the read window is open between the detection of the leading product edge by the entrance photocell 222 and the detection of the trailing product edge by the exit photocell 224. All other bar codes are ignored. The accepted bar codes are matched to a tracking record for the identified shadow to enable the computer to identify an overlapping product occurrence from multiple matched bar codes as described above. The computer 228 also receives and analyzes the signals from the photocells 221 and 222 to obtain product shadow length and width measurements. The computer 228 then compares the measured length and width to previously measured lengths and widths for product shadows to identify product overlaps in the manner previously described.

Raster scanners for reading ladder oriented codes on the bottom side of each product in the product stream are not included in the embodiment shown in FIGS. 2A, 2B, 2C and 3 because ladder oriented codes comprise roughly only ten to fifteen percent of the orientations for bar codes used on products. The pair of raster scanners 206 and the pair of line scanners 208 provided as shown will therefore scan the bar codes for approximately ninety-five percent of the products processed by the scanning subsystem 202 (all products with picket oriented codes and about one-half of the products with ladder oriented codes). It will, of course, be understood that an additional pair of raster scanners 206 for scanning the bottom of the product stream may be added when a significant portion of the products anticipated in the scanning operation will have ladder oriented bar codes. The addition of an extra set of raster scanners will change the scanning system overlap detection rules only in that an overlap will be detected when the same bar code is read by mutually exclusive raster scanners.

Reference is now made to FIGS. 4, 5A, 5B and 5C wherein there are shown flow diagrams for two routines executed by the computer shown in FIG. 3 for detecting product overlaps in a singulated product stream using the apparatus of FIGS. 1, 2A and 2B as described above. The first routine in FIG. 4 detects overlaps based on the measured length and width of the product shadow. In decision step 300, the set of entrance photoelectric cells 222 are polled to detect the leading edge of a product shadow. The longitudinal photoelectric cells 221 are then polled in step 302 to determine the number of contiguous photoelectric cells covered by the detected shadow to give a measurement of the length of the shadow. The detected shadow is then assigned a tracking record in step 304 and the shadow width is initialized in step 306.

The routine then enters a loop 308 where the product width is first determined by identifying the number of entrance photoelectric cells 222 covered by the product shadow (read step 310). Until the trailing edge of the product shadow is detected by decision step 314, the loop 308 rechecks the product width to account for any skew of the product shadow and thereby obtain the maximum width of the shadow (steps 314 and 316). The routine exits the loop 308 when the trailing edge is detected in step 312.

Once the actual shadow length and width have been determined (steps 302 and 316), the routine calculates in step 318 the expected length of the shadow by averaging the lengths of several previously measured product shadows having the same or roughly equal shadow widths. In decision step 320, the calculated average length is compared to the actual length of the product shadow obtained from the measurement in step 302. If the actual length is greater than the calculated average length by more than a predetermined amount, the product tracking record (step 304) for the shadow is marked in step 322 as an overlap and the routine returns (step 324) to await the next product shadow. Otherwise, the shadow is identified as a single product and the routine returns (step 324) to await the next product.

Figure 5A:
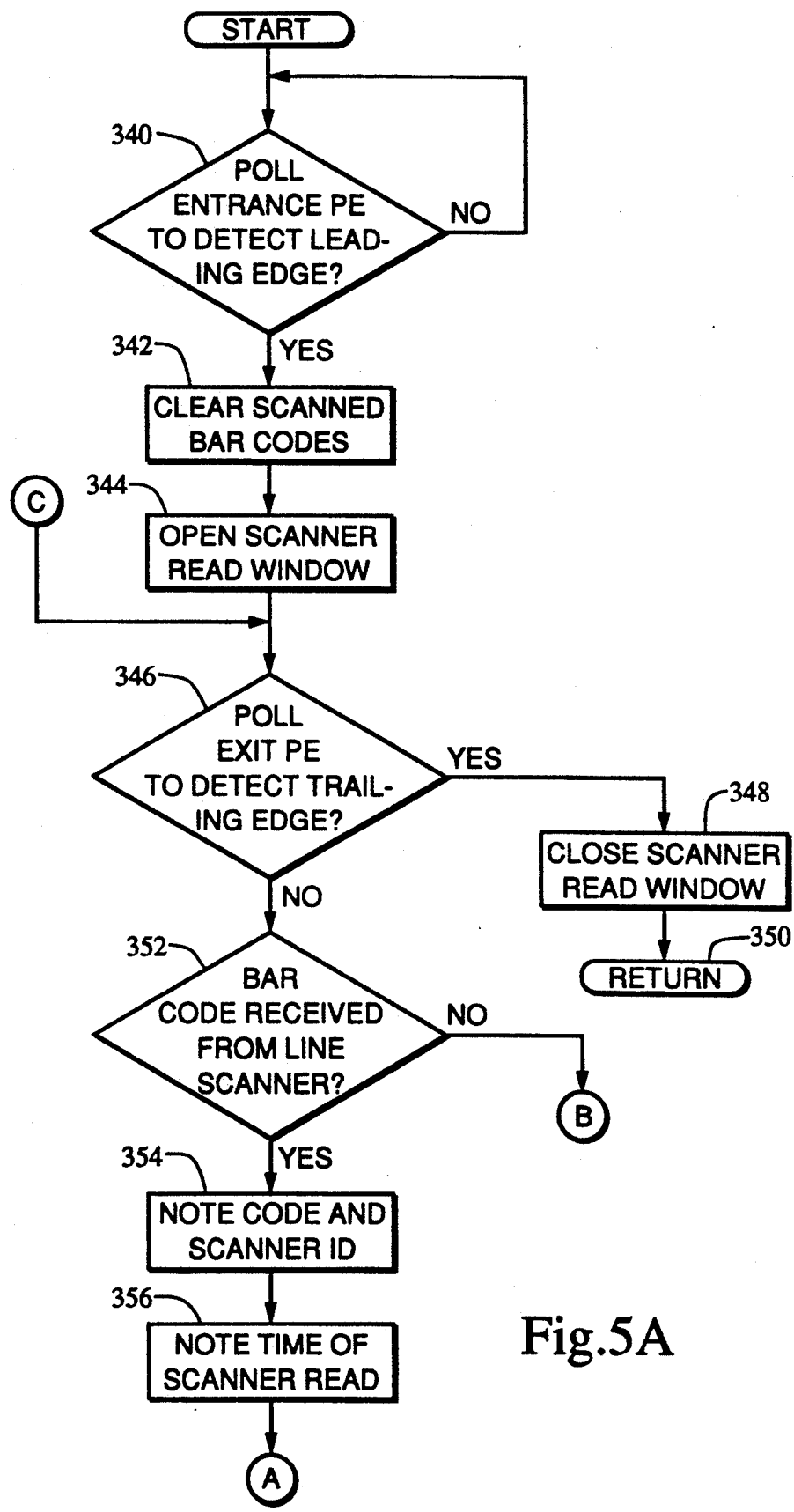
Figure 5B:
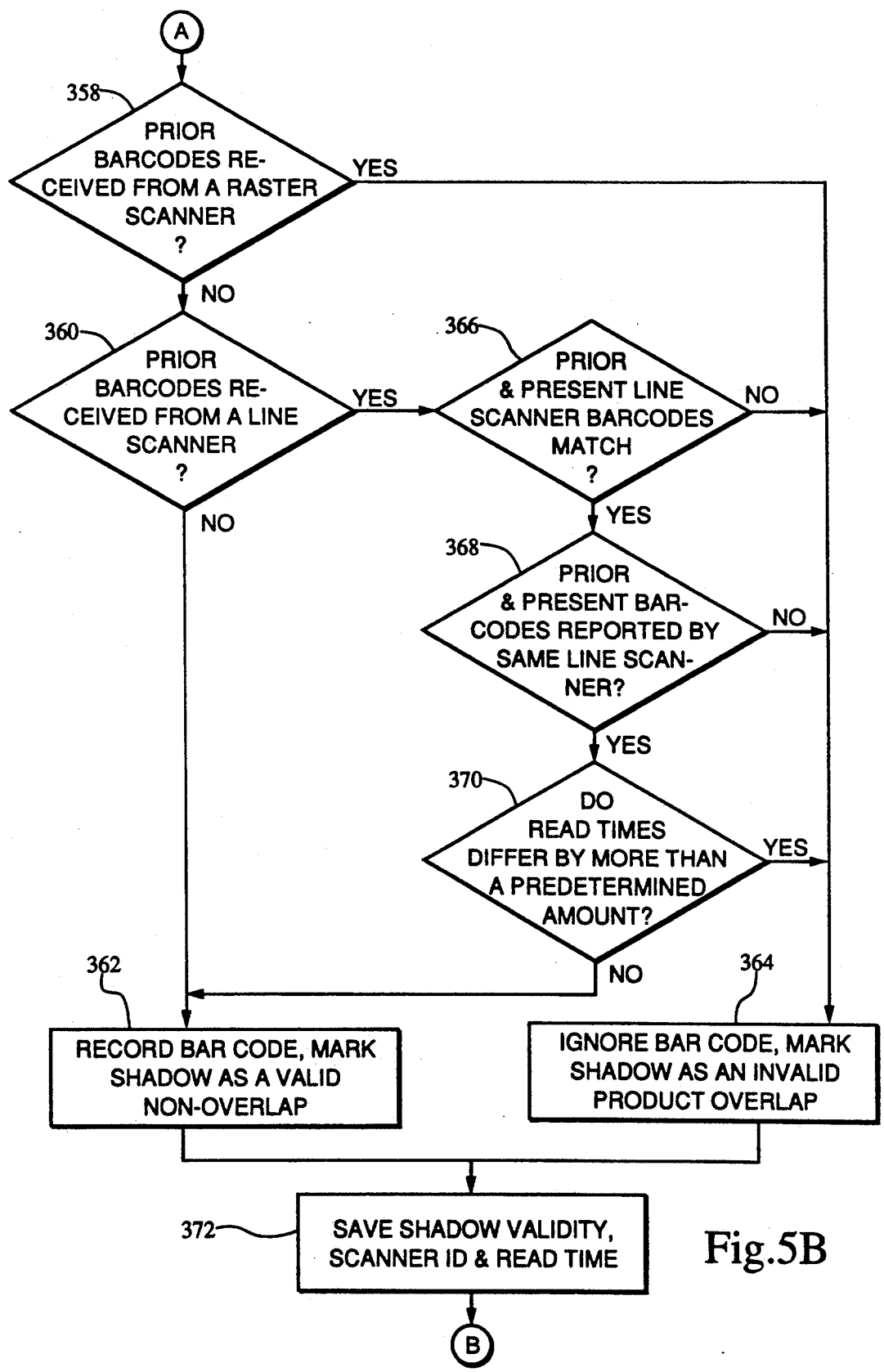
Figure 5C:
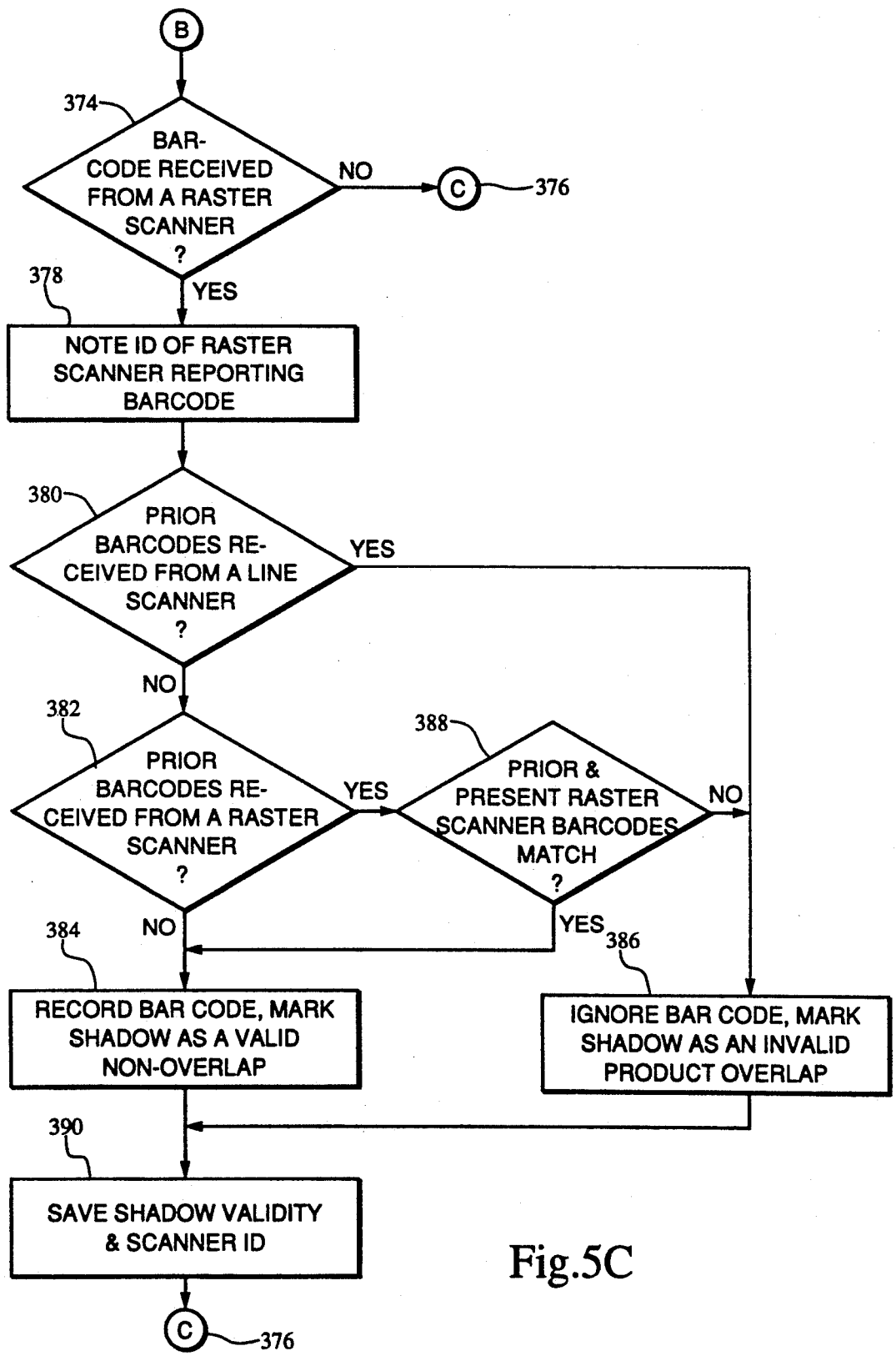

The second routine in FIGS. 5A, 5B and 5C detects overlapping products based on the scanning of multiple bar codes for a single product shadow. In decision step 340, the set of entrance photoelectric cells 222 are polled to detect the leading edge of a product shadow. Upon such a detection, all bar codes previously read by the line scanners and raster scanners are cleared (step 342) and the scanner read window for the shadow tracking record is opened (step 344). The routine then checks in decision step 346 to see if the exit photoelectric cell 224 has detected the trailing edge of the product shadow. If yes, the scanner read window is closed (step 348) for that product shadow and the routine returns (step 350) with overlap product validity and bar code information on the detected shadow to await the next product shadow.

If the exit photoelectric cell 224 has not detected the trailing edge of the product shadow, the routine polls the line scanners for a read bar code in decision step 352. If a line scanner has read a bar code, the scanner identification, bar code and time of read are noted (steps 354 and 356) in the shadow tracking record. The time of the bar code read is important in identifying whether multiple identical bar codes are present in the product shadow as will be described. If no previous bar code had been read for this read window (steps 358 and 360), the line scanner bar code is recorded in the tracking record and the shadow is marked as a valid non-overlap (step 362). If a previous bar code had been read in this read window by a raster scanner, the routine advances to step 364 and the read bar code is ignored and the shadow marked as an invalid overlap. If a previous bar code had been read in this read window by a line scanner, the routine checks in decision step 366 to see if the prior and present bar codes match. If not, the line scanner bar code is ignored and the shadow is marked by step 364 as an invalid overlap, indicating the presence of multiple products in the read window.

If the prior and present bar codes do match, decision step 368 checks the stored scanner identification (step 354) to determine if the same scanner reported each bar code. If no, the codes were read by mutually exclusive line scanners and the line scanner bar code is ignored by step 364 and the shadow is marked as an invalid overlap, indicating the presence of multiple products in the read window. If the same scanner reported the bar codes, the routine advances to decision step 370 to compare the read times (step 356) for each identical bar code read. If the read times are nearly identical, then the two scans of the same code by the same scanner are considered to be multiple scans of the same bar code on one product in a product shadow. The routine then advances to step 362 to record the code and mark the shadow as a valid non-overlap. If the times of scan differ by more than a predetermined amount, then there are at least two of the same product in the read window for a single product shadow and the line scanner bar code is ignored by step 364 and the shadow marked as an invalid product overlap. The read bar code, scanner identification, shadow overlap product validity and read time are then stored in step 372 in the tracking record for later access when comparing the next scanned bar code from a line scanner or for output in connection with the detected shadow when the routine returns in step 350.

Following either a no bar code scanned result in step 352 or the storage of line scanner information in step 372, the routine advances to check the raster scanners. In decision step 374, the raster scanners are polled for a read bar code. If the raster scanners have not read any bar codes, the routine returns (step 376) to check the line scanners. If a raster scanner has read a bar code, the scanner identification and bar code are noted (step 378) in the tracking record and a determination is made as to whether a previous bar code was read for this read window (steps 380 and 382). If no prior bar codes were read, the routine advances to step 384 and the raster scanner bar code is recorded and the shadow is marked as a valid non-overlap. If a previous bar code had been read in this read window by a line scanner, the routine advances to step 386 and the read bar code is ignored and the shadow marked as an invalid overlap. If a prior raster scanner bar code exists in this read window, the present and prior codes are compared in step 388. If the two codes are the same, then the routine advances to step 384 and the raster scanner bar code is recorded and the shadow marked as a valid non-overlap. If the two codes are not the same, then the routine advances to step 386 and the raster scanner bar code is ignored and the shadow is marked as an invalid overlap indicating the presence of multiple products in the shadow. In either event the bar code, shadow overlap product validity and raster scanner identification are stored (step 390) and routine returns (step 376) to check the line scanners. The stored bar code and shadow overlap validity are output in connection with the detected shadow for subsequent access in sorting the products when the routine returns in step 350.

Although preferred embodiments of the invention have been illustrated in the accompanying Drawings and described in the foregoing Detailed Description, it will be understood that the invention is not limited to the embodiments disclosed but is capable of numerous rearrangements and modifications of parts and elements without departing from the scope of the invention.

I claim:

1. Apparatus for detecting overlapping products in a singulated product stream wherein each single and overlapping product in the singulated steam defines a product shadow, comprising:
    transport means for moving a singulated stream of products downstream;
    sensor means for generating a measurement related to the width of each product shadow in the singulated stream;
    sensor means for generating a measurement related to the length of each product shadow in the singulated stream;
    means for storing the measurements related to the width and length of each product shadow in the singulated stream;
    means responsive to the stored measurements related to length and width for calculating an average length for previous product shadows in the singulated stream having a measured width substantially identical to the measured width of a current product shadow; and
    means for comparing the measurement related to the length of the current product shadow with the calculated average length for previous product shadows in the stream having a substantially identical measured width, whereby an overlapping product is detected for the current product shadow if the measurement related to length for the current shadow exceeds the average length for previous shadows by more than a preselected amount.

2. The apparatus for detecting overlapping products as in claim 1 wherein the sensor means for generating a measurement related to the width of each product shadow comprises a plurality of photoelectric cells positioned with periodic spacing laterally across the width of the transport means, the measurement related to the width determined by the number of photoelectric cells covered by each product shadow.

3. The apparatus for detecting overlapping products as in claim 1 wherein each product shadow in the product stream has a leading and a trailing edge and wherein the sensor means for generating a measurement related to the length of each product shadow comprises:
    a photoelectric cell positioned to detect the leading and trailing edges of the product shadow as the shadow moves downstream; and
    means for measuring the elapsed time between the detection of the leading and trailing edges of the moving product shadow.

4. The apparatus for detecting overlapping products as in claim 1 wherein the sensor means for generating a measurement related to the length of each product shadow comprises a plurality of photoelectric cells periodically positioned along the length of the transport means, the measurement related to the length determined by the number of contiguous cells detecting the product shadow.

5. Apparatus for detecting overlapping products in a singulated product stream wherein each product is affixed with a bar code and wherein each single and overlapping product in the singulated stream of products defines a product shadow on the apparatus, comprising:
    transport means for moving a singulated stream of products downstream through a scanning zone;
    first scanning means positioned above the transport means for reading and outputting any bar code affixed to a top surface of each product in a product shadow passing through the scanning zone;
    second scanning means positioned below the transport means for reading and outputting any bar code affixed to a bottom surface of each product in a product shadow passing through the scanning zone;
    means for matching bar codes read and output by the first and second scanning means for products to a scanned product shadow containing the scanned products;
    means responsive to the read bar codes matched to a scanned product shadow for identifying a product overlap in the scanned product shadow from the matching of multiple bar codes to a single product shadow.

6. The apparatus for detecting overlapping products as in claim 5 wherein the means for identifying includes means for comparing the bar codes output from the first and second scanning means to identify a product overlap if a bar code read by the first scanning means and a bar code read by the second scanning means are identical and are matched to the same product shadow.

7. The apparatus for detecting overlapping products as in claim 5 wherein the means for identifying includes means for comparing the bar codes matched to a scanned product shadow to identify a product overlap in the product shadow if at least two different bar codes are read and matched to the same product shadow.

8. The apparatus for detecting overlapping products as in claim 5 wherein the first scanning means comprises at least one raster scanner for reading a ladder oriented bar code on a top surface of each product in a product shadow passing through the scanning zone.

9. The apparatus for detecting overlapping products as in claim 5 wherein the first scanning means comprises at least one line scanner for reading a picket oriented bar code on a top surface of each product in a product shadow passing through the scanning zone.

10. The apparatus for detecting overlapping products as in claim 9 wherein the means for identifying identifies a product overlap if the same bar code was read more than once at different times by the same line scanner and matched to a single product shadow.

11. The apparatus for detecting overlapping products as in claim 5 wherein the second scanning means comprises at least one line scanner for reading a picket oriented bar code on a bottom surface of each product in a product shadow passing through the scanning zone.

12. The apparatus for detecting overlapping products as in claim 11 wherein the means for identifying identifies a product overlap if the same bar code was read more than once at different times by the same line scanner and matched to a single product shadow.

13. The apparatus for detecting overlapping products as in claim 5 wherein the second scanning means comprises at least one raster scanner for reading a ladder oriented bar code on a bottom surface of each product in a product shadow passing through the scanning zone.

14. The apparatus for detecting overlapping products as in claim 5 wherein each product shadow has a leading edge and a trailing edge and wherein the means for matching comprises:
 a photoelectric cell positioned to detect the leading edge of a product shadow entering the scanning zone and generate an entrance signal;
 a photoelectric cell positioned to detect the trailing edge of a product shadow leaving the scanning zone and generate an exit signal; and
 processing means responsive to the entrance and exit signals for assigning bar codes output by the first and second scanning means in a tracking record for the scanned product shadow during the time between the reception of the entrance and exit signals.

15. Apparatus for detecting overlapping products in a singulated product stream wherein each product is affixed with a bar code and wherein each single and overlapping product in the singulated stream of products defines a product shadow on the apparatus, comprising:
 transport means for moving a singulated stream of products downstream through a scanning zone;
 means for scanning the scanning zone for bar codes affixed to each product in each product shadow in the singulated product stream, said means comprising:
  first bar code scanning means positioned above the transport means for reading and outputting bar codes affixed to a top surface of each product in a product shadow; and
  second bar code scanning means positioned below the transport means for reading and outputting bar codes affixed to a bottom surface of each product in a product shadow;
 means for matching bar codes output by the first and second bar code scanning means to a scanned product shadow;
 sensor means for generating a measurement related to the width and a measurement related to the length of each scanned product shadow in the singulated product stream;
 means responsive to the bar codes matched to a scanned product shadow for identifying a product overlap in the product shadow from the matching of multiple bar codes to a single product shadow; and
 means for comparing the measurement related to the length of each scanned product shadow with an average length calculated from the measurement related to the length of previous product shadows in the singulated stream having a similar measurement related to width to identify a product overlap.

16. The apparatus for detecting overlapping products as in claim 15 wherein the means for identifying includes means for comparing the bar codes read by the means for scanning to identify a product overlap if at least two different bar codes are matched to a single product shadow.

17. The apparatus for detecting overlapping products as in claim 15 wherein the means for identifying includes means for comparing the bar codes read by the first and second bar code scanners and matched to a single product shadow to identify a product overlap in the product shadow if the bar code read by the first bar code scanning means is identical to the bar code read by the second bar code scanning means.

18. The apparatus for detecting products as in claim 15 wherein the first bar code scanning means comprises:
 at least one raster scanner for reading ladder oriented bar codes on the top surface of each product in each product shadow passing through the scanning zone; and
 at least one line scanner for reading picket oriented bar codes on the top surface of each product in each product shadow passing through the scanning zone.

19. The apparatus for detecting overlapping products as in claim 18 wherein the means for identifying includes means for comparing the bar codes read by the line scanner and matched to a product shadow to identify a product overlap if at least two identical bar codes are read by the line scanner at different times for the same product shadow.

20. The apparatus for detecting overlapping products as in claim 18 wherein the means for identifying further includes:
 means for recording the time of each scan of a bar code in a product shadow; and
 means for comparing the recorded times of scan for identical bar codes read by the same line scanner and matched to the same product shadow whereby a product overlap is detected if the times of each scan of the bar code differ by more than a predetermined amount.

21. The apparatus for detecting overlapping products as in claim 18 wherein the second bar code scanning means comprises at least one line scanner for reading a picket oriented bar code on a bottom surface of each product in each product shadow passing through the scanning zone.

22. The apparatus for detecting overlapping products as in claim 21 wherein the means for identifying includes means for comparing the bar codes read by the line scanners in the first and second bar scanning means and matched to the same product shadow to identify a product overlap in the product shadow if the bar code read by the first bar code scanning means is identical to the bar code read by the second bar code scanning means.

23. The apparatus for detecting overlapping products as in claim 21 wherein the second bar code scanning means further comprises at least one raster scanner for reading a ladder oriented bar code on a bottom surface of each product in each product shadow passing through the scanning zone.

24. The apparatus for detecting overlapping products as in claim 15 wherein the means for comparing identifies a product overlap in a product shadow when the measurement related to length for the product shadow exceeds by more than a preset amount the calculated average length for previous product shadows having a similar measured width.

25. The apparatus for detecting overlapping products as in claim 15 wherein each product shadow includes a leading edge and a trailing edge and wherein the means for matching comprises:
 a photoelectric cell positioned to detect the leading edge a product shadow entering the scanning zone and generate an entrance signal;
 a photoelectric cell positioned to detect the trailing edge of a product shadow leaving the scanning zone and generate an exit signal; and
 processing means responsive to the entrance and exit signals for assigning bar codes received during the time between reception of the entrance and exit signals to a tracking record for the product shadow.

26. The apparatus for detecting overlapping products as in claim 15 wherein the sensor means comprises:
 a photoelectric cell positioned to detect a leading and a trailing edge of the scanned product shadow whereby the measurement related to the length of the scanned product shadow is determined by the elapsed time between detection of the leading and trailing product shadow edges.

27. The apparatus for detecting overlapping products as in claim 15 wherein the sensor means comprises:
 a plurality of photoelectric cells periodically spaced across the width of the transport means whereby the measurement related to the width of the scanned product shadow is determined by the number of photoelectric cells across the transport path detecting the product shadow.

28. The apparatus for detecting overlapping products as in claim 15 wherein the sensor means comprises:
 a plurality of photoelectric cells periodically spaced along the length of the transport means whereby the measurement related to length of the scanned product shadow is determined by the number of contiguous photoelectric cells along the transport path detecting the product shadow.

29. A method for detecting overlapping products in a singulated product stream wherein each single and overlapping product in the singulated stream of products defines a product shadow, comprising the steps of:
 generating a measurement related to the width of each product shadow in a stream of products;
 generating a measurement related to the length of each product shadow in the stream of products;
 calculating from the generated measurements related to product shadow length for a plurality of previously measured product shadows an average length for product shadows in the stream of products having measurements related to width similar to the measurement generated for a currently measured product shadow;
 comparing the measurement related to the length of the current product shadow to the calculated average length for previous product shadows having a similar width; and
 identifying the current product shadow as a overlap if the measurement related to the length of the current product shadow exceeds by a preset amount the average length calculated for previous product shadows having a similar width.

30. A method for detecting overlapping products in a singulated product stream, wherein each product is affixed with a bar code and wherein both single and overlapping products in the singulated stream define a product shadow, comprising the steps of:
 transporting each product shadow in a product stream through a scanning zone;
 scanning the scanning zone for bar codes affixed to each product in a product shadow passing therethrough;
 matching bar codes scanned on products passing through the scanning zone to product shadows; and
 identifying a product overlap in a product shadow when at least two different bar codes are matched to the same product shadow.

31. The method for detecting overlapping products in a singulated product stream as in claim 30 wherein the step of scanning further comprises the step of:
 scanning a top and bottom side of each product in a product shadow for bar codes.

32. The method for detecting overlapping products in a singulated product stream as in claim 31 further comprising the step of:
 identifying a product overlap in a product shadow when at least one bar code read on the top of a product and one bar code read on the bottom of a product are matched to the same product shadow.

33. The method for detecting overlapping products in a singulated product stream as in claim 30 further comprising the steps of:
 recording the time each bar code is read; and
 identifying a product overlap in a product shadow when the same bar code is read more than once at different recorded times and matched to the same product shadow.

34. The method for detecting overlapping products in a singulated product stream as in claim 30 wherein each product shadow has a leading edge and a trailing edge and wherein the step of matching bar codes comprises the steps of:
 detecting the leading edge of a product shadow entering the scanning zone;
 detecting the trailing edge of the product shadow leaving the scanning zone; and
 storing bar codes scanned between the detection of the leading and trailing edges in a record assigned to the detected product shadow.

* * * * *